Patented Dec. 8, 1953

2,662,016

UNITED STATES PATENT OFFICE 2,662,016

CHEWING GUM BASE

Paul L. Merz, New Haven, Conn., and Frank Witzel and Allison S. Burhans, Canajoharie, N. Y., assignors to Beech-Nut Packing Company, Canajoharie, N. Y., a corporation of New York No Drawing. Application October 21, 1950, Serial No. 191,492

12 Claims. (Cl. 99—135)

The present invention relates to chewing gum bases that are made either wholly or partly of synthetic resins.

Polyvinyl acetate and polyvinyl ethers have heretofore been suggested for use in chewing gum bases, but they have not been found entirely satisfactory for such use.

Polyvinyl acetate as commercially available lacks the necessary chewing properties such as elasticity and plasticity. In order to impart these properties to the polymer, it has been found necessary to mix with it a suitable elastomer and a substantial quantity of wax.

Polyvinyl ethers of low enough molecular weight so as not to be too tough and rubbery for chewing gum purposes, have the disadvantage of being soft and sticky, and the additional disadvantage of being unstable and breaking down to volatile, obnoxious products, when subjected to the required elevated temperatures during the usual purification treatment and during mixing with the other gum base ingredients. Because of their soft, sticky nature they cannot be used as a total gum base, and require mixing with wax, elastomers, and resins to make a suitable gum base. Furthermore, in order to prevent the decomposition of the polyvinyl ethers, stabilizers must be added. These stabilizers are, in the main, quite toxic in nature, and therefore are generally unsuited for use in chewing gum. The polyvinyl ethers themselves impart very little elasticity to the gum base. Gum base mixtures using either polyvinyl esters or polyvinyl ethers resemble, but do not duplicate, the natural chicles heretofore used in the very finest chewing gum.

We have found that by copolymerizing vinyl esters and vinyl ethers in suitable proportions and under the special conditions hereinafter described, the resulting products not only have the desired plasticity, but are also of the desired elasticity, and otherwise closely resemble natural chicle in chewing qualities. Such similar desirable qualities cannot be obtained by merely mixing polyvinyl esters and polyvinyl ethers. Copolymerization of vinyl esters and vinyl ethers under the special conditions herein set forth produces a materially greater elasticity than would be anticipated from a consideration of the physical properties of either the polyvinyl ethers or the polyvinyl esters. Our copolymers are prepared at elevated temperatures and under pressure, and this is necessary in order to produce the low molecular weight copolymers suitable as chewing gum base components. Furthermore, since the interaction between vinyl esters and vinyl ethers is slow using peroxide catalysts and at lower temperatures (35°–100° C.), the higher temperatures are necessary to produce copolymers containing from 30% to 60% of the vinyl ether reacted therein which are the most desirable with respect to elasticity in chewing gum bases. In copolymerizing vinyl acetate and vinyl ethyl ether (boiling point 72° C. and 28.3° C. respectively) the range of reaction temperatures is limited from approximately 30° C. to 80° C. under reflux conditions. However, by reacting under pressure in a sealed reaction vessel it is practical to copolymerize between 100° C. and 250° C. to obtain the soft elastic chewable resins desired. In polymerizing vinyl acetate and vinyl butyl ether or vinyl acetate and vinyl isobutyl ether (the ethers boiling at 93.5° C. and 83° C. respectively) the reaction temperature is limited from 30° to about 100° C. and no copolymerizing occurs at such low temperatures and the resulting products mixture of polymers are non-elastic and unsuitable for use in chewing gum, and the vinyl ether content is substantially reduced. Under pressure conditions, however, we prefer to react at from 125° C. to 250° C. in order to obtain sufficiently low molecular weight and to produce resins of sufficiently high ether content to have the desired elasticity.

The most suitable temperatures for producing the desired products varies, of course, with the ratio of the esters and ether monomers used and with the particular vinyl ether copolymerized with vinyl acetate. In the case of vinyl acetate-vinyl butyl ether copolymers the range of 140° C.–160° C. is preferred when a copolymer having a 7:3 to a 4:6 ratio of vinyl acetate to the vinyl butyl ether is desired.

An additional important advantage of the copolymers is based on their chemical homogeneity which gives a much smoother and longer chew and which shows no tendency to separate as do mere mechanical mixtures.

Furthermore, such polymerization of vinyl ethers with vinyl esters, particularly vinyl acetate, imparts considerable stability to the resulting plastic mass, and stabilizers are not required for the copolymers as is the case with the pure polyvinyl ethers.

The vinyl ester component may be any of the vinyl esters of organic monocarboxylic acids of the classes (1) having the general formula:

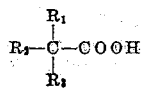

where $R_1$, $R_2$, $R_3$ may be either hydrogen, alkyl, aryl or aryl alkyl groupings, or any combination thereof and (2) benzoic acid and its alkyl substituted derivatives.

The vinyl ether component of these copolymers may be any one of the classes having the general formula (1) 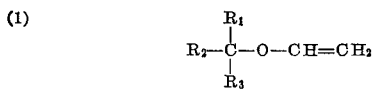

where $R_1$, $R_2$, $R_3$ may be either hydrogen, alkyl, alkoxy alkyl, aryl or aryl alkyl groupings, or any combination thereof, and (2)                

where R is an aryl or aryl alkyl grouping.

The preferred composition of vinyl ester to vinyl ether in the copolymers lies in the range of 8:2 to 4:6, but copolymers richer in either component are useful depending on the choice of the two reactants combined, and in the percentages used in the gum base in combination with fillers and natural resins. For instance, vinyl acetate has a greater stiffening effect on the copolymer than vinyl butyrate, so that less of the latter would be required to yield a vinyl ethyl ether-vinyl butyrate copolymer of similar physical characteristics to a vinyl ethyl ether-vinyl acetate copolymer. Similarly the higher alkyl ethers, such as butyl vinyl ether, have a greater softening effect than do the lower members of the series, and therefore should be used in smaller proportions in the copolymer to obtain the desired plasticity.

Combinations of the various copolymers are likewise suitable as all, or part, of the chewing gum base.

EXAMPLES

The following preparative procedure serves merely to characterize these copolymers and is only one general method of preparing these desirable gum base resins.

Example I

| | Parts |
|---|---|
| Vinyl acetate | 30 |
| Normal butyl vinyl ether | 20 |
| Benzoyl peroxide | 0.625 |

Copolymerization was accomplished by heating the above in a sealed reaction vessel for four hours at a temperature of 160° C. After removal of unreacted components by mechanical separation, an elastic, tasteless, light colored resin was obtained which had very desirable chewing characteristics. It was further characterized by an average molecular weight in the range of 5500 (using $Km.=2.6\times10^{-4}$ in the Staudinger Equation) and had a composition of 82% vinyl acetate: 18% n-butyl vinyl ether.

This resin was suitable for use as all or a part of a chewing gum base as shown in the following examples, which describe the formulation of these bases in chewing gum.

Example II

| | Per cent |
|---|---|
| Copolymer (of Example I) | 26.5 |
| Corn syrup (44°) | 24.0 |
| Cane sugar | 48.3 |
| Peppermint oil | 1.2 |
| | 100.0 |

These ingredients were compounded in the usual manner of those versed in the art to a relatively homogeneous mass. A chewing gum of excellent chewing characteristics was thus obtained, which closely resembled chewing gum made by similar means from natural chicle base.

Example III

| | Per cent |
|---|---|
| Copolymer (of example I) gum base | 12.4 |
| Chicle, gum base | 12.4 |
| Corn syrup (44°) | 22.5 |
| Cane sugar | 51.7 |
| Peppermint oil | 1.0 |
| | 100.0 |

These ingredients were compounded in the usual manner to yield a chewing gum of excellent chewing qualities and which very closely resembled chewing gum made by similar means from natural chicle base.

Example IV

A vinyl acetate-vinyl ethyl ether copolymer prepared by a procedure similar to that described in Example I and having a molecular weight in the range of 3000 (using $Km.=2.6\times10^{-4}$ in the Staudinger Equation) and a composition of 69% vinyl acetate: 31% vinyl ethyl ether was used as a complete gum base in a formulation similar to Example II. The resulting chewing gum likewise had excellent chewing characteristics.

Example V

The vinyl acetate-vinyl ethyl ether copolymer described in Example IV was used with equal parts of chicle as a gum base in a formulation similar to Example II to yield a chewing gum likewise having excellent chewing characteristics.

Example VI

A vinyl acetate-vinyl isobutyl ether copolymer prepared by a procedure similar to that described in Example I and having a molecular weight in the range of 3000 (using $Km.=2.6\times10^{-4}$ in the Staudinger Equation) and a composition of 77% vinyl acetate: 23% vinyl isobutyl ether had desirable physical characteristics such as elasticity and plasticity thus being similar to natural chicle and was similarly of use as all or part of a chewing gum base.

Example VII

A vinyl butyrate-vinyl ethyl ether copolymer prepared by a procedure similar to that described in Example I and having a molecular weight in the range of 2200 (using $Km.=2.6\times10^{-4}$ in the Staudinger Equation) and a composition of 74% vinyl butyrate: 26% vinyl ethyl ether was also found suitable as all or part of a chewing gum base.

Example VIII

A mixture of equal parts of the vinyl acetate-vinyl n-butyl ether of Example I and the vinyl acetate-vinyl ethyl ether of Example IV had such desirable physical characteristics as elasticity and plasticity, thus being similar to natural chicle and was therefore of use as all or part of a chewing gum base.

It will be apparent from the foregoing that the copolymer made from vinyl ester and vinyl ether in suitable proportions may be used as the sole constituent of the chewing gum base. It may also be used as a part of the gum base, or as an extender for chicle or other natural gum or for other synthetic resins used in gum bases. Also, its chewing qualities may be varied by varying the proportion of vinyl ester and vinyl ether employed, or by the addition of wax, elastomers, fillers, or other ingredients commonly used in chewing gum bases for this purpose.

This application is a continuation in part of our pending application Serial No. 777,596, filed October 2, 1947.

What we claim is:

1. A chewing gum containing a vinyl ester-vinyl ether copolymer of the composition 85 to 5% of a vinyl ether consisting of one of the classes having the general formula (1)

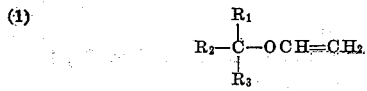

where $R_1$, $R_2$, $R_3$ selected from the group consisting of hydrogen, alkyl, aryl or aryl alkyl, and (2) $\quad R{-}O{-}CH{=}CH_2$ where R is an aryl or aryl alkyl grouping, and 15 to 95% of a vinyl ester of a monocarboxylic acid of the classes (1) having the general formula:

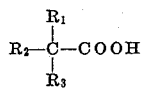

where $R_1$, $R_2$, $R_3$ selected from the group consisting of hydrogen, alkyl, aryl or aryl alkyl, and (2) benzoic acid and its alkyl substituted derivatives, and having a molecular weight such that the copolymer has desirable elastic and plastic properties for a chewing gum base.

2. A chewing gum containing a vinyl acetate-vinyl ethyl ether copolymer of the composition 85 to 5% of the vinyl ethyl ether and 15 to 95% of vinyl acetate, and having a molecular weight such that the copolymer has desirable elastic and plastic properties for a chewing gum base.

3. A chewing gum containing a vinyl acetate-vinyl n-butyl ether copolymer of the composition 85 to 5% of vinyl n-butyl ether and 15 to 95% of vinyl acetate and having a molecular weight such that the copolymer has desirable elastic and plastic properties for a chewing gum base.

4. A chewing gum containing a vinyl acetate-vinyl iso-butyl ether copolymer of the composition 85 to 5% of vinyl iso-butyl ether and 15 to 95% of vinyl acetate and having a molecular weight such that the copolymer has desirable elastic and plastic properties for a chewing gum base.

5. A chewing gum containing a vinyl butyrate-vinyl ethyl ether copolymer of the composition 85 to 5% of vinyl ethyl ether and 15 to 95% of vinyl butyrate and having a molecular weight such that the copolymer has desirable elastic and plastic properties for a chewing gum base.

6. A chewing gum containing from 20 to 80% of a vinyl ester-vinyl ether copolymer of the composition 85 to 5% of a vinyl ether consisting of one of the classes having the general formula (1)

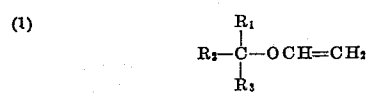

where $R_1$, $R_2$, $R_3$ selected from the group consisting of hydrogen, alkyl, aryl or aryl alkyl and (2) $\quad R{-}O{-}CH{=}CH_2$ where R is an aryl or aryl alkyl grouping, and 15 to 95% of a vinyl ester of a monocarboxylic acid of the classes (1) having the general formula:

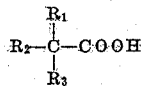

where $R_1$, $R_2$, $R_3$ selected from the group consisting of hydrogen, alkyl, aryl or aryl alkyl and (2) benzoic acid and its alkyl substituted derivatives, and having a molecular weight such that the copolymer has desirable elastic and plastic properties for a chewing gum base, and 80 to 20% of a natural gum.

7. A chewing gum containing from 80 to 20% of a vinyl ester-vinyl ether copolymer of the composition 85 to 5% of a vinyl ether consisting of one of the classes having the general formula (1)

where $R_1$, $R_2$, $R_3$ selected from the group consisting of hydrogen, alkyl, aryl or aryl alkyl, and (2) $\quad R{-}O{-}CH{=}CH_2$ where R is an aryl or aryl alkyl grouping, and 15 to 95% of a vinyl ester of a monocarboxylic acid of the classes (1) having the general formula:

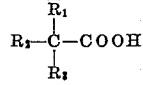

where $R_1$, $R_2$, $R_3$ selected from the group consisting of hydrogen, alkyl, aryl or aryl alkyl, and (2) benzoic acid and its alkyl substituted derivatives, and having a molecular weight such that the copolymer has desirable elastic and plastic properties for a chewing gum base, and from 19 to 55% of a natural gum, and from 1 to 25% of a filler.

8. A chewing gum containing vinyl acetate-vinyl n-butyl ether copolymer in proportion of the order of 82 per cent vinyl acetate and 18 per cent vinyl n-butyl ether, the average molecular weight of the copolymer being from 2200 to 5500.

9. A chewing gum containing from 80 to 20 per cent of a copolymer of the composition 85 to 5% of a vinyl ether consisting of one of the classes having the general formula (1)

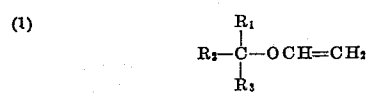

where $R_1$, $R_2$, $R_3$ selected from the group consisting of hydrogen, alkyl, aryl or aryl alkyl, and (2) $\quad R{-}O{-}CH{=}CH_2$ where R is an aryl or aryl alkyl grouping, and 15 to 95% of a vinyl ester of a monocarboxylic acid of the classes (1) having the general formula:

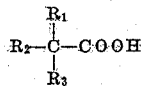

where $R_1$, $R_2$, $R_3$ selected from the group consisting of hydrogen, alkyl, aryl or aryl alkyl and (2) benzoic acid and its alkyl substituted derivatives, and having a molecular weight such that the copolymer has desirable elastic and plastic properties for a chewing gum base, and from 18 to 50 per cent of a natural gum, and from 1 to 20 per cent of a filler, and from 1 to 10 per cent of a wax selected from the group consisting of candelilla, beeswax and carnauba.

10. A chewing gum containing a vinyl acetate-vinyl n-butyl ether copolymer, the acetate and ether being in the range of substantially 15:85 to 95:5 and the molecular weight of the copolymer being from 2200 to 5500.

11. A chewing gum containing a copolymer consisting of 15 to 95 per cent of vinyl acetate and 85 to 5 per cent of a monomer selected from the group consisting of vinyl ethyl ether, vinyl n-butyl ether and vinyl isobutyl ether, the average molecular weight of the copolymer being from 2200 to 5500.

12. A chewing gum containing a vinyl acetate-vinyl n-butyl ether copolymer, the acetate and ether being in the range of substantially 15:85 to 95:5, and the average molecular weight of the copolymer being from 2200 to 5500.

PAUL L. MERZ.
FRANK WITZEL.
ALLISON S. BURHANS.

References Cited in the file of this patent

UNITED STATES PATENTS

| Number | Name | Date |
|---|---|---|
| 2,016,490 | Fikentscher | Oct. 8, 1935 |
| 2,265,640 | Garvey et al. | Dec. 9, 1941 |
| 2,366,672 | Mustin | Jan. 2, 1945 |
| 2,413,239 | Manson | Dec. 24, 1946 |